(No Model.)
C. L. FORTIER.
FIRE EXTINGUISHING APPARATUS.
No. 468,439. Patented Feb. 9, 1892.
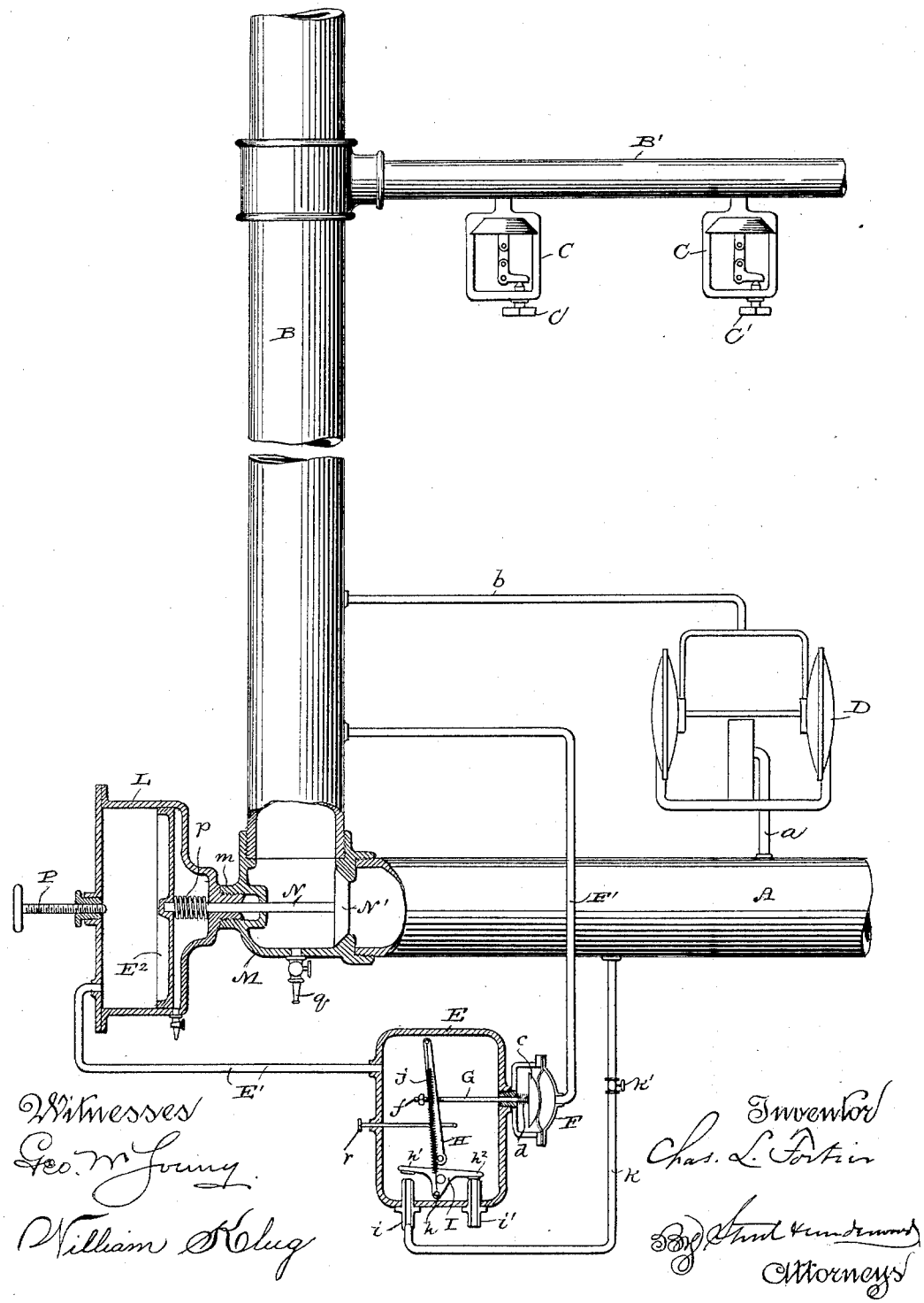

United States Patent Office.

CHARLES L. FORTIER, OF MILWAUKEE, WISCONSIN, ASSIGNOR TO GEORGE KNOWLES, JR., OF SAME PLACE.

FIRE-EXTINGUISHING APPARATUS.

SPECIFICATION forming part of Letters Patent No. 468,439, dated February 9, 1892.

Application filed March 29, 1889. Serial No. 305,230. (No model.)

*To all whom it may concern:*

Be it known that I, CHARLES L. FORTIER, of Milwaukee, in the county of Milwaukee, and in the State of Wisconsin, have invented certain new and useful Improvements in Fire-Extinguishing Apparatus; and I do hereby declare that the following is a full, clear, and exact description thereof.

My present invention relates to automatic fire-extinguishing apparatus, and will be fully described hereinafter.

In the drawing the figure is a sectional elevation of my invention.

A is the service-pipe, and B is the main sprinkler-pipe, to which a smaller sprinkler-pipe B' is connected.

C are the sprinklers, which may be of any desired form.

D is an air-pump, which may be operated by the pressure of water from the service-pipe through pipe $a$ or by any other means. This air-pump is connected to main sprinkler-pipe by a pipe $b$.

E is a valve-chamber, and F an expansion-chamber, the elastic wall of which bears upon a head $c$, which is held out against it by a spring $d$, through which the stem G of the head presses, and this stem G, projecting through the wall of valve-chamber E, is provided with a lug $f$ for engagement with a lever H, that is pivoted at its lower end to the valve-chamber.

Just beneath the pivot of lever H a rock-bar I is pivoted, and an arm $h$ of this rock-bar, that depends from the center of its under side, is connected with the upper end of lever H by a spring $j$. The rock-bar I has two other arms $h'$ and $h^2$, which are on their under side faced with valve-surfaces, and one of these arms $h'$ overhangs a port $i$, while the other overhangs a port $i'$, the former leading from a pipe $k$, that connects with service-pipe A, and the other leading to the open air.

L is an expansion-chamber that is connected to the coupling M, that joins pipes A and B, and this chamber L is connected with valve-chamber E by a pipe E'. The movable wall $E^2$ of chamber L is connected directly to the stem N of a valve N', that closes pipe A, which stem passes from one to the other through a stuffing-box $m$, and a spring $p$ is interposed between the inner wall of the chamber L and its movable wall, which spring has a constant tendency to contract the chamber L and cause its movable wall $E^2$ to open valve N'.

The operation of my device is as follows: The expansion-chamber F is connected by a pipe F' with sprinkler-pipe B, and it is normally expanded by the air from pump D through pipes $b$, B, and F' after the apparatus is set for operation, which is done as follows: Before the water is let into the service-pipe from the water-mains cock $k'$ in pipe $k$ is closed and the movable wall $E^2$ is forced in to close valve N' by a plunger P, that is screw-threaded and works in a correspondingly-screw-threaded opening in the outer wall of chamber L. The pipe B is now drained through a cock $q$, and then the cock $q$ is closed and the air-pump started and chamber F expanded. Now by means of a hooked rod $r$, that passes through a stuffing-box in the wall of chamber E, the lever H is drawn into the position shown in the figure, causing the rock-bar I to open port $i$ and close port $i'$. The rod $r$ is then thrust back out of the way and the water from the main admitted to pipe A, and cock $k'$ is opened, when the water will enter chamber L through valve-chamber E, and as its pressure on wall $E^2$ will be sufficient to hold valve N' tightly in its seat the plunger P is then withdrawn. The apparatus is now set for service and operation as follows: When by the action of one or more of the thermostats C' of the sprinklers C under the influence of abnormal heat one or more of the sprinklers is "set off," the diminution of air-pressure in pipe B, caused by the escape of air through the sprinklers, will relieve expansion-chamber F, when it will be collapsed by spring $d$, and its stem, drawing lever H forward of its pivotal center, will rock the bar I and cause it to open port $i$ and close port $i'$, thus relieving chamber L of pressure, when the spring $p$, acting through piston N and aided by the water-pressure in pipe A upon valve N', will open valve N' and permit the water from service-pipe A to enter pipes B and B' and thus reach the sprinklers.

I do not propose to limit myself to the exact construction and arrangement of the parts as shown, as these may be varied indefinitely.

Having thus fully described my invention, what I claim as new, and desire to secure by Letters Patent, is—

1. The combination of a service-pipe, a sprinkler-pipe and sprinkler or sprinklers, and a valve between the two pipes of an expansion-chamber the movable wall of which is connected to said valve, a pipe connecting the service-pipe and expansion-chamber, a source of compressed-air supply and a valve-chamber interposed between the service-pipe and expansion-chamber, an intermediate expansion-chamber connected with the sprinkler-pipe, a port leading from the valve-chamber to the open air, a rock-bar provided with valves for closing the port that leads from the fluid-supply to the valve-chamber and that leads to the open air alternately, and connections between the movable wall of the expansion-chamber and the rock-bar, whereby it is caused, by the collapse of the intermediate expansion-chamber, to exhaust the fluid from the main expansion-chamber to permit the main valve to open, as set forth.

2. The combination, with the sprinklers, sprinkler-pipe, and supply-pipe, of a valve interposed between the two pipes, an expansion-chamber, one wall of which is connected with the stem of said valve, a valve-chamber connected with said expansion-chamber and having ports, one of which leads from the supply-pipe and the other to the open air, a pivoted three-armed rock-bar having a valve-surface on the under side of two of its arms for closing the last-named ports alternately, an upright lever pivoted at its lower end above the rock-bar, a spring connecting the upper end of the upright lever with the lower arm of the rock-bar, an auxiliary expansion-chamber and a source of air-supply connected with such auxiliary expansion-chamber through the sprinkler-pipe, and a stem operated by said last-named chamber in one direction and a spring for operating it in another direction, and connections between said stem and upright lever whereby when the last-named chamber is expanded the lever may be moved in one direction beyond its center and when it is contracted the spring will draw it in the other direction beyond its center, substantially as set forth.

3. The combination, with the sprinklers, sprinkler-pipe, and service-pipe, of a valve between the two pipes, an expansion-chamber and its movable wall and stem connecting the valve and movable wall, a retracting-spring arranged on the stem, a valve-chamber and pipes interposed between the expansion-chamber and fluid-supply, ports leading from the valve-chamber, one of which goes to the open air, and a double-valve and an expansion chamber connected therewith and with the sprinkler-pipes, as set forth.

In testimony that I claim the foregoing I have hereunto set my hand, at Milwaukee, in the county of Milwaukee and State of Wisconsin, in the presence of two witnesses.

CHARLES L. FORTIER.

Witnesses:
S. S. STOUT,
WILLIAM KLUG.